Patented Nov. 15, 1938

2,136,651

UNITED STATES PATENT OFFICE 2,136,651

CHOCOLATE MILK POWDER

Ernest D. Fear, Kansas City, Mo., assignor to DeRaef Corporation, Kansas City, Mo., a corporation of Missouri No Drawing. Application April 2, 1937,
Serial No. 134,572

4 Claims. (Cl. 99—24)

My invention relates to a chocolate milk concentrate, and more particularly to a chocolate flavored product containing a concentrated milk product.

Chocolate flavored beverages are popular. "Milk shakes", and "malted" milk drinks are sold in large quantities at soda fountains and the like. Chocolate syrups and chocolate flavored preparations are obtainable for the preparation of chocolate flavored milk drinks in the home.

A chocolate flavored milk drink in general must be violently agitated in its preparation and, if the drink is permitted to stand, the chocolate will settle to the bottom of the glass in which the drink is contained. Violent agitation is necessary in order to permit a thorough suspension of the chocolate throughout the drink.

One object of my invention is to provide a chocolate flavored preparation containing a milk product which is adapted to be used in the confection of a chocolate flavored milk drink which is readily soluble so that a drink may be quickly and conveniently prepared.

Another object of my invention is to provide a preparation for use in the confection of milk drinks in which the chocolate will be suspended throughout the drink and the tendency for the chocolate to settle out will be inhibited.

Other and further objects of my invention will appear from the following description.

In general, my invention contemplates a preparation comprising broadly a milk concentrate such as desiccated powdered skimmed milk, whole milk or the like, or condensed milk and chocolate or cocoa in finely divided form, and minor quantities of added flavoring such as vanilla or malt extract, or both, sugar such as dextrose, cane sugar or the like, and alkaline milk compounds naturally occurring in milk such as calcium hydroxide, magnesium hydroxide or the like.

The alkaline milk compounds act as deflocculating agents for the casein which is present in the milk, both in the milk to which the powder is to be added and in the finely divided milk powder contained in the preparation. The deflocculated casein is adapted to act as a protective colloid, holding the finely divided cocoa or chocolate in suspension.

The following is an example of a preparation made in accordance with my invention:

| | Per cent |
|---|---|
| Finely divided milk powder | 45 |
| Sugar | 25 |
| Cocoa | 25 |
| Malt extract | 3.5 |
| Calcium or magnesium oxide | 1 |
| Vanilla extract | .5 |

In making the preparation, the ingredients may be mixed with liquid skimmed milk or whole milk or the like, agitated to insure thorough solution and then desiccated so that the ingredients are thoroughly disseminated in the resulting finely divided powder.

It is to be understood that the above example is given by way of illustration and not by way of limitation, as the ingredients may be varied to suit the individual tastes, it being only necessary to have present a sufficient amount of the deflocculating agent so that the casein in the milk to which the powder is added, as well as the casein present in the milk powder will be enabled to act as a protective colloid to prevent the cocoa from settling.

In confecting a milk drink, a teaspoon or a tablespoon, or any desired quantity according to individual taste, is added to milk and stirred into solution. The resulting drink will have a "fluffy", smooth taste. Sugar may be added to sweeten in accordance with individual tastes. The drink may be served hot or cold.

Due to the fact that an alkaline agent is present, not only will the casein be deflocculated to act as a protective colloid, but the drink is rendered substantially neutral or slightly alkaline so that lactic acid bacillus growth is deterred. This will improve the keeping qualities of a prepared drink, enabling a quantity of a drink to be premixed and stored in a refrigerator for use.

A chocolate syrup may also be confected by the use of the powder and water and it will be found that the chocolate will remain in suspension without the necessity of adding gelatin gums or the like as has heretofore been necessary in the confection of chocolate syrups.

The concentrate may be prepared with condensed milk in the form of a syrup or may be prepared in the form of a syrup and evaporated to have the consistency of a paste so that it may be extracted to form confectionery bars. In any event, the composition should contain enough alkaline deflocculating agent so as to render the composition neutral or slightly alkaline.

It will be seen that I have accomplished the objects of my invention. I have provided a composition of matter, adapted to be used in the confection of chocolate flavored milk drinks which will go into solution readily and which will give a smooth drink in which the chocolate is disseminated evenly throughout, and in which the chocolate will tend to stay in suspension.

Having thus described my invention, what I claim is:

1. A composition of matter including in combination an intimate mixture of finely divided milk powder, sugar, cocoa, and a small percentage of an added alkaline deflocculating agent selected from the group consisting of calcium oxide and magnesium oxide.

2. A composition of matter including in combination an intimate mixture of finely divided milk powder, sugar, cocoa, and one per cent of an added alkaline deflocculating agent selected from the group comprising calcium oxide and magnesium oxide.

3. A composition of matter consisting of a finely divided, intimate mixture containing the following:

| | Per cent |
|---|---|
| Milk powder | 45 |
| Sugar | 25 |
| Cocoa | 25 |
| Malt extract | 3.5 |
| Vanilla | .5 |
| Calcium oxide | 1 |

4. A composition of matter consisting of a finely divided, intimate mixture containing the following:

| | Per cent |
|---|---|
| Milk powder | 45 |
| Sugar | 25 |
| Cocoa | 25 |
| Malt extract | 3.5 |
| Vanilla | .5 |
| Magnesium oxide | 1 |

ERNEST D. FEAR.